Sept. 30, 1952    O. DENLINGER    2,612,001
METHOD OF CUTTING BRITTLE TUBING
Filed May 12, 1950    2 SHEETS—SHEET 1
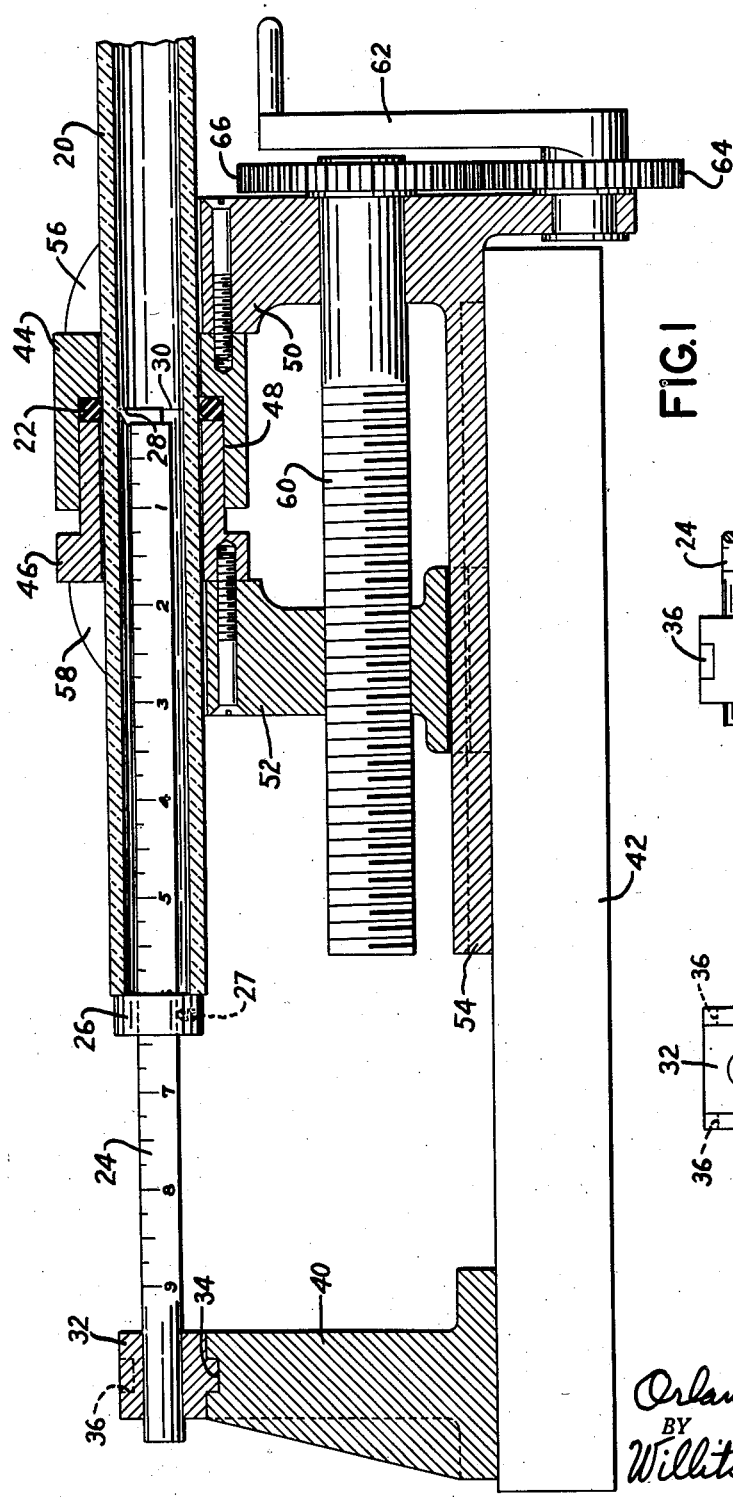
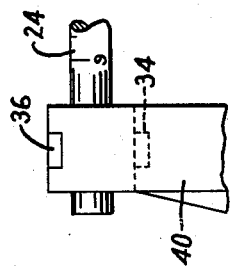
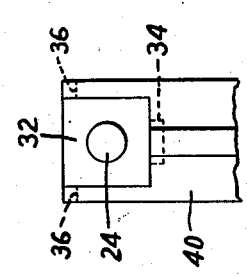
INVENTOR.
Orlan Denlinger
BY
Willits Hardman and Fehr
Attorneys Sept. 30, 1952  O. DENLINGER  2,612,001
METHOD OF CUTTING BRITTLE TUBING
Filed May 12, 1950  2 SHEETS—SHEET 2
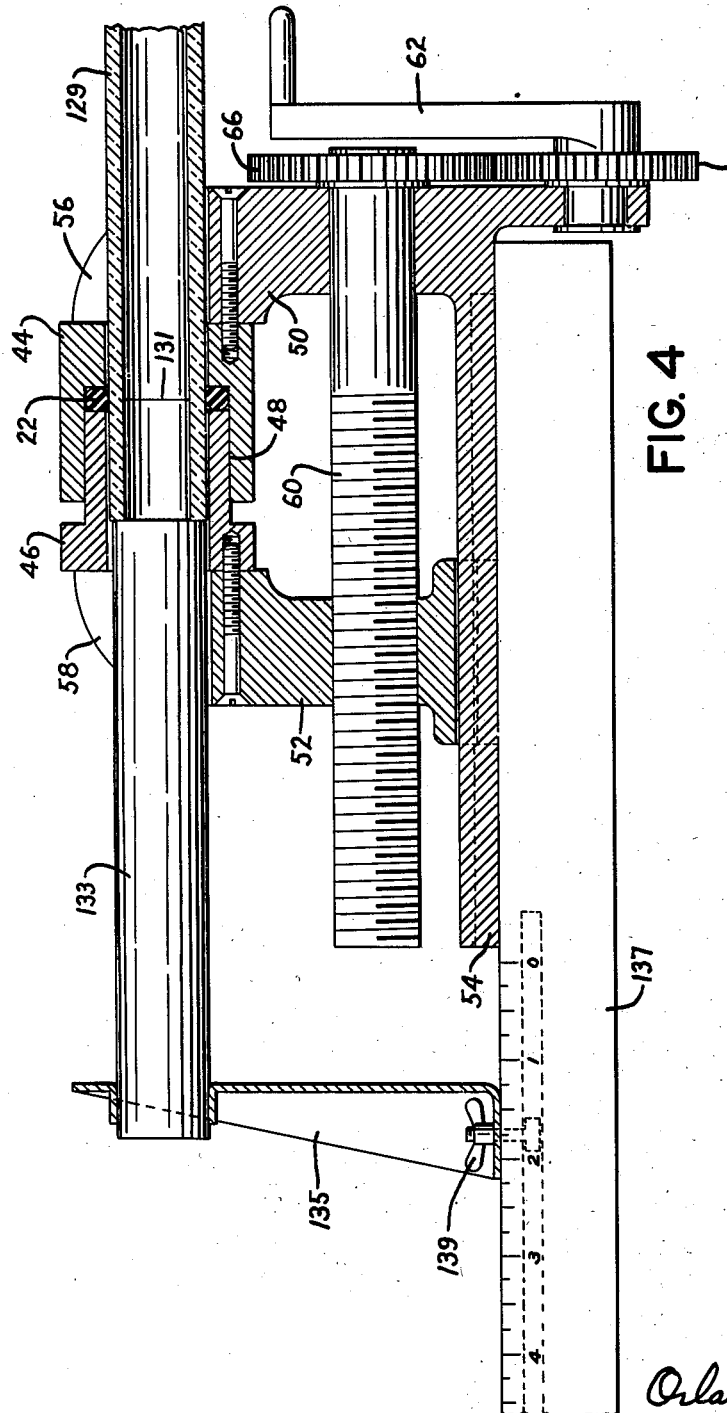
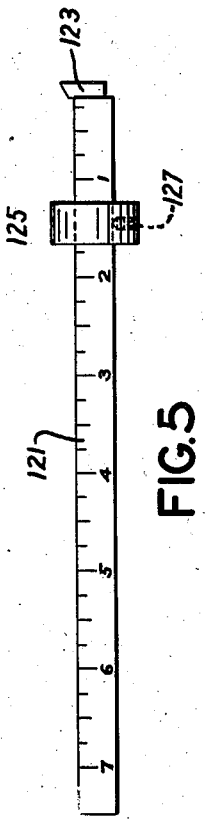
INVENTOR.
Orlan Denlinger
BY
Willits Hardman and Fehr
attorneys Patented Sept. 30, 1952

2,612,001

UNITED STATES PATENT OFFICE 2,612,001

METHOD OF CUTTING BRITTLE TUBING

Orlan Denlinger, Dayton, Ohio, assignor to General Motors Corporation, Dayton, Ohio, a corporation of Delaware Application May 12, 1950, Serial No. 161,558

6 Claims. (Cl. 49—77)

This invention relates to a method of cutting brittle tubing such as glass and porcelain.

It has always been difficult to cut glass tubing and the like exactly at the place and in the configuration as desired. This is especially true with respect to very short lengths of tubing. It has been particularly difficult to obtain a smooth cut or break which is substantially square or perpendicular to the axis of the tubing.

It is therefore an object of my invention to provide an improved method of cutting brittle tubing and the like in which the tubing can be cut squarely to any desired length.

It is another object of my invention to provide an improved method of cutting brittle tubing and the like which is simple, safe, reliable and accurate.

It is another object of my invention to provide an improved method of cutting brittle tubing and the like in which the tool and labor costs are low.

It is another object of my invention to provide an improved method of cutting brittle tubing and the like in which the tubing can be cut with a chamfered or beveled end.

To attain these objects, at the desired point of cutting I clamp between two clamping members a ring of a rubber-like material. These two clamping members are forced together by clamping in a vise or other suitable means of applying force to squeeze the rubber-like ring so tightly into contact with the outer surface of the tube that the tubing is cleanly cut at the location of the ring.

Further objects and advantages of the present invention will be apparent from the following description, reference being had to the accompanying drawings, wherein a preferred form of the present invention is clearly shown.

In the drawings:

Fig. 1 is a vertical sectional view of one form of apparatus for carrying out my improved method.

Fig. 2 is a fragmentary view in elevation of a part of the support of the gauging and scoring means.

Fig. 3 is a fragmentary end view of the support for the gauging and scoring means.

Fig. 4 is a vertical sectional view of another form of apparatus for carrying out my improved methods; and Fig. 5 is a view in elevation of a scoring device which may be used with the apparatus shown in Fig. 4.

Referring now to the drawings and more particularly to Fig. 1 there is shown a piece of brittle tubing such as the glass tubing 20. While glass tubing is used as an example, the method and apparatus are applicable to brittle tubing of various materials such as glass, porcelain, quartz and ceramic materials. As a specific example it is assumed that it is desired to cut the glass tubing 20 to an exact length of 6 inches.

To do this conveniently, I provide a rod 24 having a scale thereon marked off in inches and fractions thereof. An adjustable clamping stop 26 is provided upon the rod 24 and in Fig. 1 is shown clamped by its set screw 27 exactly at the 6 inch mark upon the rod 24. For convenience the rod 24 has its left end extending through and fixed tightly in a block 32 which is held in a receptacle provided in the support 40. This block 32 has a tongue 34 upon its lower face and arms 36 extending from its upper face which fit into complementary notches in the support 40. This particular mounting arrangement of the block 32 and support 40 provides a firm support for the rod 24. The support 40 is firmly mounted upon the table 42 or other suitable type of support.

The cutting apparatus is properly located relative to the rod 24 so that the cutting of the tubing 20 will take place exactly at the length indicated by the location of the adjustable clamping stop 26. The cutting apparatus essentially includes a member 22 of a soft material or synthetic rubber or any other soft and elastic rubber-like material which will act like a hydraulic fluid when under compression. This member 22 is conveniently in the form of a ring which is substantially circular in cross section. However, it is not necessary that this be a ring or a circular in cross section since a straight piece of material may be placed around the tubing and will operate in exactly the same way. The rubber-like member 22 is so located that when it is compressed, its center line is exactly aligned with the end of the rod 24. The rubber-like member 22 is held within a recess formed between two telescoping members 44 and 46. These telescoping members 44 and 46 are coaxially arranged relatively to the tubing 20 with a reasonable amount of clearance. The member 44 has a cylindrical recess 48 which receives the rubber-like member 22 and the projecting portion of the member 46. The telescoping members 44 and 46 fit together with a snug, slip-fit.

The member 44 is conveniently fastened to the fixed jaw 50 of a vise. The fixed jaw 50 is located relative to the support 40 and the rod 24 in such a way that the adjacent end of the rod 24 is exactly opposite the center line of the rubber-like member 22 when it is compressed. The member 46 is fastened to the movable jaw 52 of the vise which is slidably mounted upon a guideway 54 in the form of a projecting portion of the fixed jaw 50. The jaws 50 and 52 are provided with notches 56 and 58 to receive the tubing 20 to be cut.

In my method, no scoring of the tubing 20 is necessary. However, better control over the cut is obtained by scoring the inside of the tubing. If it is desired that the cut be straight and square then the interior of the tubing 20 should be scored exactly at the center line of the rubber-like member 22 when it is compressed. For this purpose the rod 24 is provided at its inner end with a sharp scoring tool 28 preferably made of some very hard material such as Carboloy. The scoring tool 28 may be provided with a diamond point if desired. To use this scoring tool 28 the tubing 20 is threaded through the rubber-like member 22 and the telescoping members 44 and 46 until its end is firmly pressed against the adjustable clamp stop 26. While the tubing 20 is held against this clamping stop 26 it is rotated so that the scoring tool 28 will be pressed against the inner wall of the tubing and will score the inner wall of the tubing exactly at the center line of the rubber-like material when compressed to provide the scoring ring 30 as shown in Fig. 1. If it should be desired to provide a chamfered end upon the tubing 20 the scoring ring 30 is not made at the center line of the rubber-like member 22 when compressed but is made to one side or the other of this center line a distance equal to the amount of chamfering desired.

The actual cutting of the tubing is accomplished by bringing the jaws 50 and 52 of the vise together to squeeze the rubber-like member 22 until the tubing 20 is cut exactly at the center line of the rubber-like member 22 when it is squeezed sufficiently to completely fill the recess between the telescoping members 44 and 46 and press firmly against the outer surface of the tubing 20. To bring the jaws 50 and 52 together I provide a large screw 60 rotatably mounted in the fixed jaw 50 and threads through the movable jaw 52. To rotate this screw 60 I provide a crank 62 rotatably mounted upon a downwardly projecting portion of the vise 50. This crank 62 is provided with a pinion 64 which meshes with a gear 66 fixed to the end of the screw 60 so that the jaws 50 and 52 may be readily moved together as desired.

When the tubing is cut as desired the vise is opened and the block 32 can be readily removed from its support 40 and withdrawn, to remove from the member 46 the cut section of the glass tubing which can then be withdrawn from the rod 24. After this, the block 32 and the scoring rod 24 can be replaced and more pieces of tubing can be cut in the same manner very conveniently.

In the form shown in Figs. 4 and 5, the scoring and the measuring functions are independent. In this form, the rubber-like member 22, the telescoping members 44 and 46, as well as the vise which includes the jaws 50 and 52, the screw 60 and the crank 62 and gears 64 and 66 are the same as in Fig. 1. This form differs from the form shown in Fig. 1 in that there is provided a separate scoring device 121 having thereon a scale in inches and fractions thereof as well as a scoring tool 123 and an adjustable clamping gauge 125. The gauge 125 is provided with a set screw 127 for clamping purposes.

In using this apparatus, the tubing 129 is scored prior to the insertion of the tubing 129 into the telescoping members 44 and 46. The adjustable clamping gauge 125 is set to the exact length of the tubing desired. In this particular example, the length desired is 1¼". The scoring tool 123 is inserted into the end of the tubing 129 until the adjustable clamping gauge 125 firmly engages the end of the tube 129. While the gauge 125 is held against the end of the tubing, the scoring tool 123 is pressed against the interior wall of the tube 129 and rotated around this interior surface through an angular distance of at least 360°. This will provide the scoring circle 131 shown within the tubing 129.

To properly locate the end of the tubing 129 within the telescoping members 44 and 46, I provide a stop member 133, the inner end of which serves as a stop to locate the end of the tubing 129. The other end of the stop 133 is fixed to the adjustable bracket 135. This bracket 135 is adjustably clamped to the table 137 on which the vise is mounted. The table is provided with a scale in inches and fractions thereof which is coordinated with the bracket 135 and the position of the stop 133 relative to the location of the telescoping member 44 and the rubber-like member 22 to indicate the location of the end of the tubing 129 relative to the line of cutting 131 of the tubing 129. The bracket 135 is clamped to the table 137 by a wing nut 139 which threads onto a screw having its head slidably mounted in a keyhole type of slot in the table 137. The scale upon the edge of the table is arranged to cooperate with the vertical face of the bracket 135 to indicate the distance from the end of the tubing 129 at which the cutting will take place.

While I have provided convenient stops and scoring tools for convenient use, it should be understood that it is not necessary that these conveniences be used but that my method may be carried out merely by use of an ordinary vise and the rubber-like member 22 with any suitable means for squeezing the rubber-like member 22 firmly onto the outer surface of the tubing 129. Although I have shown a vise as the means of squeezing the rubber-like member 22 it should be understood that the other arrangements for applying the squeezing force to this rubber-like member may be used if desired.

While the form of embodiment of the invention as herein disclosed, constitutes a preferred form, it is to be understood that other forms might be adopted, as may come within the scope of the claims which follow.

What is claimed is as follows:

1. The method of cutting brittle tubing and the like which includes scoring the interior of the tubing along the line at which it is desired to cut the tubing, surrounding the tubing at the place of scoring with a member of a soft rubber-like material, confining the outer surfaces of said member and gradually squeezing said member to apply a pressure upon the outer surfaces of the tubing surrounding the line of scoring until the tubing is cut.

2. The method of cutting brittle tubing which includes placing a member of a soft rubber-like material in contact with the tubing at the desired line of cutting and squeezing the member to cause the member to flow and be forced tightly into contact with the tubing until the tubing is cut.

3. The method of cutting brittle tubing which includes placing a member of a soft rubber-like material in contact with the tubing at the desired line of cutting and squeezing the opposite faces of the member and confining its outer surface to cause the member to flow inwardly and be forced tightly into contact with the tubing until the tubing is cut.

4. The method of cutting brittle tubing which includes scoring the tubing at the desired line of cutting, placing a member of rubber-like material around the tubing at the place where it is scored, and forcing the member into contact with the tubing until it is cut where scored.

5. The method of cutting brittle tubing and the like which includes placing a member of a soft rubber-like material around the tubing where it is desired to cut the tubing, and squeezing the member to force it into contact with the tubing until it cuts the tubing.

6. The method of cutting brittle tubing and the like which includes placing a member of a soft rubber-like material around the tubing where it is desired to cut the tubing, confining its outer surface and squeezing one of the opposite sides toward the other to force a portion of the member inwardly into firm contact with the tubing with increasing force until the tubing is cut.

ORLAN DENLINGER.

REFERENCES CITED

The following references are of record in the file of this patent:

UNITED STATES PATENTS

| Number | Name | Date |
| --- | --- | --- |
| 999,668 | Montaperto | Aug. 1, 1911 |
| 1,922,426 | Fahrney | Aug. 15, 1933 |
| 2,116,129 | Stringer | May 3, 1938 |
| 2,157,067 | Brown et al. | May 2, 1939 |
| 2,442,495 | Hull et al. | June 1, 1948 |